United States Patent
Concilio et al.

(10) Patent No.: US 9,847,599 B2
(45) Date of Patent: Dec. 19, 2017

(54) LONGITUDINAL, TOLERANCE-MITIGATING CAM-LOCK FASTENING SYSTEM

(71) Applicant: Raytheon Company, Waltham, MA (US)

(72) Inventors: Andrew Nicholas Concilio, Tucson, AZ (US); Stephen K. Bliss, Tucson, AZ (US); Robert J. Di Tolla, Tucson, AZ (US); Trent N. Henderson, Tucson, AZ (US); Robert J. Hanold, Tucson, AZ (US); Andrea Toso, Parma (IT); E. Russ Althof, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 523 days.

(21) Appl. No.: 14/517,432

(22) Filed: Oct. 17, 2014

(65) Prior Publication Data

US 2016/0111818 A1    Apr. 21, 2016

(51) Int. Cl.
*F16B 21/02*    (2006.01)
*H01R 13/629*    (2006.01)
(Continued)

(52) U.S. Cl.
CPC ... *H01R 13/62905* (2013.01); *F16B 12/2036* (2013.01); *F42B 15/00* (2013.01); *F42B 15/36* (2013.01); *F16B 21/04* (2013.01)

(58) Field of Classification Search
CPC .............. F16B 12/2009; F16B 12/2036; F16B 2012/2018; F16B 5/0657; F16B 5/0664;
(Continued)

(56) References Cited

U.S. PATENT DOCUMENTS 3,863,570 A * 2/1975 Bixby ..................... F42B 15/36
102/377
4,070,844 A    1/1978 Elze
(Continued)

FOREIGN PATENT DOCUMENTS

FR    1486437 A    6/1967

OTHER PUBLICATIONS

Dallara, Indy Car Series 2010 Spare Parts Catalogue, Mar. 31, 2010.

*Primary Examiner* — Matthieu F Setliff
*Assistant Examiner* — Matthew R McMahon
(74) *Attorney, Agent, or Firm* — Eric A. Gifford (57) ABSTRACT

A cam-lock fastening system is designed to accommodate a tolerance stackup to fasten a pair of rigid structures. A spring allows some longitudinal motion of the pin that would not be accommodated by the rigid structures or metal cam-lock and pin. The spring-loaded pin is also suitably designed to produce a preloaded structural joint that is between specified minimum and maximum loads for any tolerance stackup that is within specification. The fastening of the structures requires no manual adjustment of the pin, and facilitates blind connection of a high-fidelity electrical connector. Further, the described cam-lock fastening system is designed for high performance applications requiring preload forces in the thousands of pounds per square inch.

13 Claims, 9 Drawing Sheets

(51) Int. Cl.
*F16B 12/20* (2006.01)
*F42B 15/36* (2006.01)
*F42B 15/00* (2006.01)
*F16B 21/04* (2006.01)

(58) Field of Classification Search
CPC ...... F16B 5/0258; F16B 21/04; F16B 5/0266; H01R 13/62905; F42B 16/36; Y10T 24/4578
See application file for complete search history.

(56) References Cited

U.S. PATENT DOCUMENTS

| | | | |
|---|---|---|---|
| 4,313,567 A | 2/1982 | Feight | |
| 4,332,432 A * | 6/1982 | Colleran | H01R 13/62905 439/157 |
| 5,152,161 A | 10/1992 | Lee | |
| 5,157,409 A | 10/1992 | Hamin | |
| 5,672,068 A * | 9/1997 | Tsuchiya | H01R 13/62933 439/157 |
| 6,293,813 B1 * | 9/2001 | Johnston | H01R 13/62933 439/157 |
| 6,805,564 B2 * | 10/2004 | Shinozaki | H01R 13/518 439/157 |
| 6,979,067 B2 | 12/2005 | Yang | |
| 6,997,496 B2 * | 2/2006 | Danev | B62D 27/06 296/146.5 |
| 7,530,779 B2 | 5/2009 | Holloway et al. | |
| 8,419,959 B2 * | 4/2013 | Bettencourt | H01J 37/3244 156/345.34 |
| 8,827,182 B2 * | 9/2014 | Vacher | B05B 7/0815 239/291 |
| 9,168,646 B2 * | 10/2015 | Galota | B25B 5/06 |
| 9,245,716 B2 * | 1/2016 | de la Llera | H01J 37/32091 |
| 2007/0196196 A1 * | 8/2007 | Schorling | F16B 21/04 411/555 |
| 2011/0027038 A1 * | 2/2011 | Hsu | H01L 23/4093 411/105 |
| 2012/0055632 A1 | 3/2012 | De La Llera | |
| 2014/0147228 A1 * | 5/2014 | Kobayashi | F16B 31/02 411/103 |

* cited by examiner

LONGITUDINAL, TOLERANCE-MITIGATING CAM-LOCK FASTENING SYSTEM

GOVERNMENT RIGHTS

This invention was made with United States Government support under Contract Number H94003-04-D-006 with the Department of Defense. The United States Government has certain rights in this invention.

BACKGROUND OF THE INVENTION

Field of the Invention

This invention relates to cam-lock fastening systems for attachment of components, and more particularly to a cam-lock fastening system; providing for a structural and electrical interface that facilitates rapid attachment, removal and reattachment of mechanical and electro/mechanical components with tight alignment tolerances. The cam-lock fastening system can be used, for example, to facilitate "plug and play" of different missile payloads to a common airframe.

Description of the Related Art

A cam-lock fastening system is used to fasten a pair of structures and to provide a clamping load or "preload" at the surface between the structures. The cam-lock fastening system includes a metal cam-lock and a metal pin. The cam-lock includes an engagement port to co-operate with a key to rotate the cam-lock about a rotation axis and a radial slot having an eccentric inner diameter in a plane perpendicular to the rotation axis. The pin includes a threaded aft end for attachment to a structure and a forward conical tapered end that defines an aft facing pin-to-cam-lock contact surface. The pin is threaded into a first structure and fixed. The cam-lock is received in a cylindrical opening in a second structure along the rotation axis.

To fasten the structures, the pin is roughly aligned with and inserted into an opening in the second structure along a longitudinal axis perpendicular to the rotation axis that opens into the cylindrical cam-lock opening. In an uncammed, unlocked position, the pin is inserted through the radial slot into the cam-lock. The key is inserted into the engagement port and turned to rotate the cam. The radial slot engages the pin's pin-to-cam-lock contact surface and draws the pin forward along the longitudinal axis into a fully-cammed and locked position.

The cam-lock and pin are designed such that drawing the pin forward produces an intended preload (force) in the longitudinal axis on the surfaces between the structures to clamp them together. The design assumes a certain nominal position of the pin inside the cam-lock in the unlocked position. If the pin extends too far into the cam-lock, the draw on the pin and preloading of the surface will be reduced. Conversely if the pin does not extend far enough into the cam, the draw on the pin and preloading of the surface will be increased.

The cam-lock and pin as received into their respective structures will exhibit a certain tolerance stackup along the longitudinal axis. This stackup may be more or less than the nominal position. As long as the tolerance stackup lies within the tolerance (+/−x inches) to which it was designed, the pin can be received in the cam-lock. Rotation of the cam-lock into the fully cammed and locked position fastens the structures and provides the desired preloading.

A common use for cam-lock fasteners is for the assembly of "Do It Yourself" furniture. A pin is threaded into a pre-drilled hole in a first structure and fixed. The cam-lock is placed in a pre-drilled hole in a second structure. The pin is inserted into the cam-lock, which is then rotated to the fully cammed and locked position clamping the first structure to the surface of the second structure. The tolerance stackup in this type of DIY furniture can be fairly loose, perhaps +/−0.030" for example. The mechanics of a metal cam-lock and pin cannot absorb this amount of variation, as the metal pin cannot strain that much.

Figure 1A:
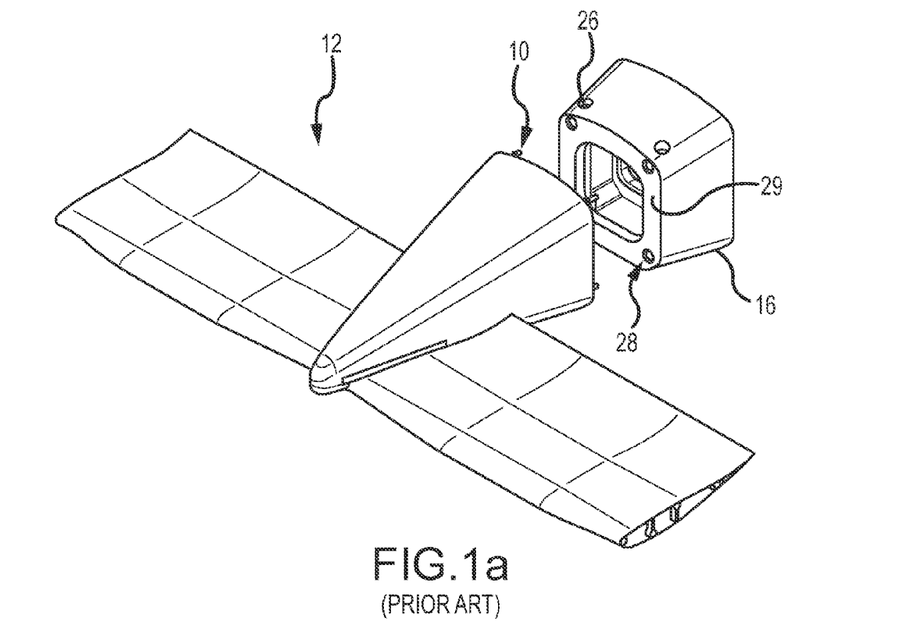
FIGS. 1a and 1b are views of a cam-lock fastening system for fastening a nose and wing assembly to an INDYCAR® racecar body and 1c is a view of the cam-lock assembly.
Figure 1B:
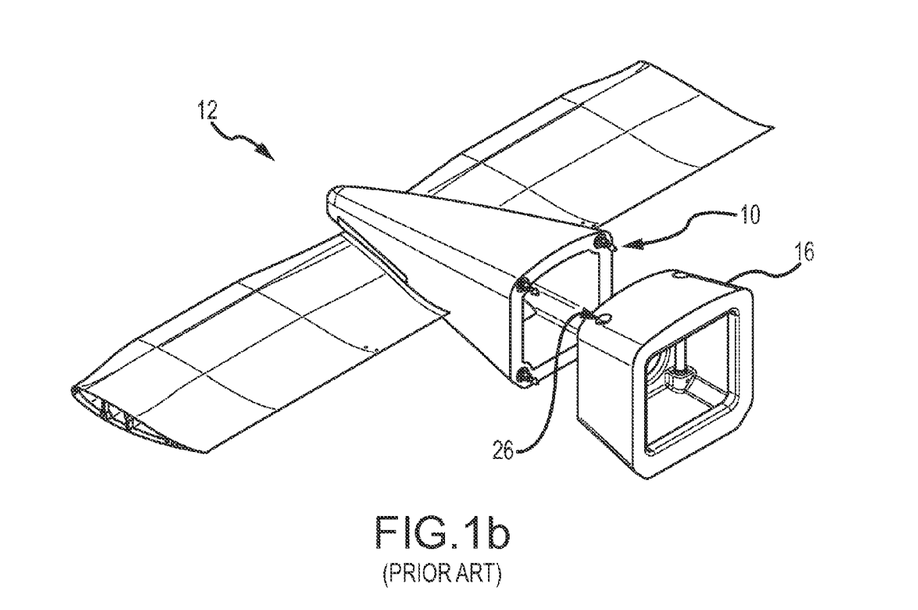
Figure 1C:
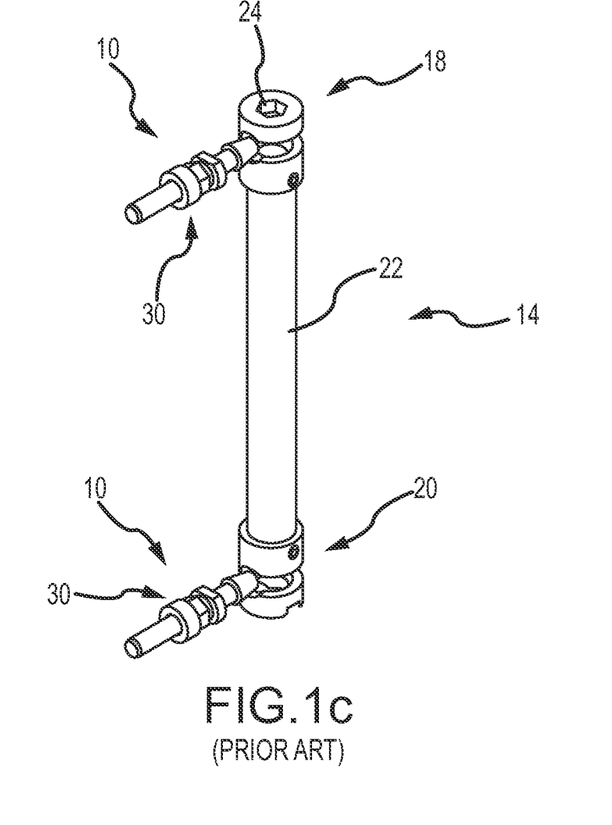

Dallara Automobili developed a system that uses a modified cam-lock fastener to rapidly attach and detach nose and wing assemblies for Indy Racing League (IRL) or INDYCAR® cars during races (See Dallara Indy Car Series 2010 Spare Parts Catalogue). As shown in FIGS. 1a, 1b and 1c, four pins 10 are threaded into pre-drilled holes on an aft portion of a nose and wing assembly 12. A pair of cam-lock assemblies 14 are mounted within a forward section 16 of the car. Each cam-lock assembly 14 includes a pair of cam-locks 18 and 20 attached to opposite ends of a cam shaft 22. The top cam-lock 18 includes a key port 24 that is accessible through a port 26 in the forward section 16 of the car. A pattern of four holes 28 (to match the pattern of pins) is formed in a surface 29 of the forward section to access the cams. The nose and wing assembly 12 is aligned to the front of the car, the pins are inserted into the holes, and a key is used to cam and lock each assembly. To remove the nose and wing assembly 12, the key is used to uncam and unlock each assembly. This approach provides a fast and reliable way to detach and attach nose and wing assemblies during a race.

Although the principles are the same, the exact cam-lock fastening system used for DIY assembly of wood furniture cannot be used to fasten the nose and wing assembly to an INDYCAR® racecar. Racecar structures are metal or composites and thus will not strain like DIY wood to absorb a tolerance stackup. Although tolerances of an INDYCAR® racecar and assembly are considerably tighter than DIY furniture, they are not tight enough. The required tolerance is in the range of +/−0.001" to fasten a pair of metal or composite structures using a metal cam-lock and pin.

To address this problem in INDYCAR®, the pin was adapted to include an "adjustment nut" 30. The adjustment nut can be used to very precisely adjust how far the pin extends from the nose and wing assembly to achieve the tight tolerance. For an INDYCAR® race, prior to the race, crew members will adjust the adjustment nut on each pin on each of several nose and wing assemblies to be a perfect fit. To do this, the crew member must put the assembly on the car, try to lock down the assembly, remove the assembly, finely adjust the nut and repeat until camming all four of the pins can be done quickly under race conditions and provide an adequate clamping load to fasten the assembly to the car. If the pin adjustment is too long, the preload will not be sufficient to fasten the assembly and the assembly will rattle and move. If the pin adjustment is too short, the crew team might not be able to fully cam and lock the fastener. This is a highly time consuming process, but is acceptable as part of prerace preparation due to the limited number of nose assembly to car combinations.

In the defense industry, missile sections are attached and detached regularly. The fastening mechanism must provide a precise preloaded structural joint that is robust to bending moments under extreme flight conditions and provide the ability to make multiple electrical connections. The fastening mechanism must also absorb the tolerance variation due to design and manufacture of the multiple missile sections and different payloads. The current approach generally requires a large number of individual radial screws to join payload sections to the missile bodies or much less precise and costly methods like marman clamps. Additionally electrical connections that cross the sections are generally hand connected and secured with service loops in the harness. These methods are time consuming in both the production and field environment and rely heavily on operator skill and experience to meet design requirements

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a longitudinal tolerance-mitigating cam-lock fastening system for fastening rigid structures with a specifically designed preloaded structural joint without manual adjustment. The fastening mechanism also facilitates a blind electrical interconnect between the structures through its single axis, longitudinal design.

In an embodiment, the cam-lock fastening system comprises a pin plate assembly and a cam plate assembly. The pin plate assembly comprises a pin plate configured for attachment to a first structure and a pin assembly comprising a pin positioned through a first through hole in the pin plate along a longitudinal axis, a stop on an aft section of the pin, and a spring element captured between the stop and a back surface of the pin plate. The cam plate assembly is configured for attachment to a second structure. The cam plate assembly comprises a cam-lock configured to receive the pin in an unlocked position and an engagement port configured to rotate the cam-lock to draw the pin forward along the longitudinal axis. The spring element can compress to maintain the designed preload throughout its deflection resulting in a clamping force on the surface between the first and second structures as the cam-lock rotates to a locked position. The pin and cam plate assemblies may include multiple aligned pins and cam-locks to ensure the clamping force is adequate. The pin and cam plate assemblies may be discretely attached or integrated into their respective structures.

In an embodiment, the pin has a shoulder that is larger than the first through hole. In the unlocked position, the spring is partially compressed pressing the pin shoulder against a front surface of the pin plate. Rotation of the cam-lock draws the pin forward along the longitudinal axis such that the pin shoulder is pulled away from the pin plate causing the spring to compress further and preload the surface with a designed clamping load as the cam-lock rotates to a locked position. The total length the spring compresses varies with the actual tolerance variation of the two sections.

In an embodiment, the first through hole in the pin plate has a first diameter, and the cam plate assembly comprises a cam plate having a second through hole of a second diameter larger than the first diameter. The pin has an aft section of the first diameter that extends through said first through hole in the pin plate and the pin shoulder has the second diameter and extends through the second through hole in the cam plate.

In an embodiment, the pin plate assembly comprises an electrical connector and the cam plate assembly comprises a complementary mating electrical connector. The alignment and insertion of the pin into the cam-lock "blindly" aligns the electrical connector to the complementary mating electrical connector. Rotating the cam-lock to draw the pin forward engages the electrical connector with the complementary mating electrical connector.

In an embodiment, the pin plate and cam plate assemblies are used to facilitate interchangeable "plug and play" of a missile section/payload with a host structure. The payload and attached/integrated cam plate assemblies are designed for a specified connector and signal list, mechanical tolerance, and structural preload. Provided the payload tolerance stackup satisfies the specification, the payload can be interchangeably attached and detached to the host structure without any manual adjustment to provide a preloaded structural joint having a preload between specified minimum and maximum loads. Any payload meeting the tolerance stackup specification is thus interchangeable with any host structure and vice versa These and other features and advantages of the invention will be apparent to those skilled in the art from the following detailed description of preferred embodiments, taken together with the accompanying drawings, in which:

DETAILED DESCRIPTION OF THE INVENTION

The present invention provides a longitudinal tolerance-mitigating cam-lock fastening system for fastening rigid metal or composite structures with a preloaded structural joint without manual adjustment. The fastener provides a preload between specified minimum and maximum loads over a specified tolerance stackup. The fastener also facilitates a blind, high-fidelity electrical connection between the structures.

A conventional cam-lock and pin is not practical to fasten rigid structures with any type of tolerance. The cam-lock fastening system adapted for INDYCAR® racing is a very good solution for racecars. However, that labor-intensive approach is not practical for assembly and disassembly of mass-produced products. Furthermore, the approach cannot guarantee a specified minimum preload of the structural joint, which may be required in certain applications such as missile systems.

The present invention replaces the standard threaded pin, with or without adjustment nut, with a pin plate assembly that utilizes a spring element with the pin. The spring-loaded pin is designed to accommodate a tolerance stackup to fasten a pair of rigid structures. The spring allows some longitudinal motion that would not be accommodated by the rigid structures or metal cam-lock and pin. The spring-loaded pin is also suitably designed to produce a preloaded structural joint that is between specified minimum and maximum loads for any tolerance stackup that is within specification. The fastening of the structures requires no manual adjustment of the pin, and facilitates longitudinal, blind connection of a high-fidelity electrical connector.

Referring now to FIGS. 2a and 2b and 3a through 3d, an embodiment of a spring-loaded cam-lock fastener 50 is shown in unlocked and fully cammed and locked positions. Fastener 50 includes a cam plate assembly 52 and a pin plate assembly 54. Cam plate assembly 52 comprises a cam plate 56 having through hole 58 formed therein, a cam-lock 60 having a radial slot 62 with an eccentric inner diameter and an engagement port 64 configured for co-operating with a key 65 to rotate the cam-lock about a rotation axis 66 from an unlocked position to a fully cammed and locked position.

Pin plate assembly 54 comprises a pin plate 70 having a through hole 72 and a pin assembly 74. Pin assembly 74 comprises a pin 76 positioned in through hole 72 along a longitudinal axis 78, a stop 79 on an aft section of the pin and a spring 80 captured and compressed between the stop and a back surface of pin plate 70. Pin 76 includes an aft section 82 that extends aft through the through hole 72 in the pin plate aftwards, a shoulder 84 whose diameter is greater than through hole 72 and a forward section 86 recessed to define an aft facing pin-to-cam contact surface 88.

In an unlocked position, compressed spring 80 draws pin 76 aftwards so that the pin's shoulder 84 engages a front surface of the pin plate 70. The stiffness of the spring and the deflection of the spring from its relaxed position define a baseline preload. Pin 76 is inserted through the through hole 58 in cam plate 56 into cam-lock 60. Key 65 engages engagement port 64 to rotate the cam-lock 60 about rotation axis 66 perpendicular to the longitudinal axis 78 such that the radial slot 62 engages the pin-to-cam contact surface 88 and draws the pin 76 forward along the longitudinal axis such that the pin shoulder 84 is pulled away from the pin plate 70 causing the spring 80 to compress further and preload a surface 90 between the cam plate 56 and pin plate 70 (first and second structures) with a clamping load between specified minimum and maximum loads as the cam-lock rotates to a fully cammed and locked position. The key 65 may be rotated either manually or via an automated mechanical system.

The cam plate assembly and pin plate assemblies are attached to the structures to be fastened. Each assembly may be discretely attached to or integral with its structure. For example, the pin plate assembly may be bolted or screwed onto an exterior surface of its structure or attached to an interior surface of its structure with the pin extending through the wall. In the latter case, the structural joint is formed with the exterior surface of the structure. The cam plate assembly may bolted or screwed onto its structure or attached to an interior surface. In the latter case, the cam plate forms the surface/wall of the structure.

Figure 2A:
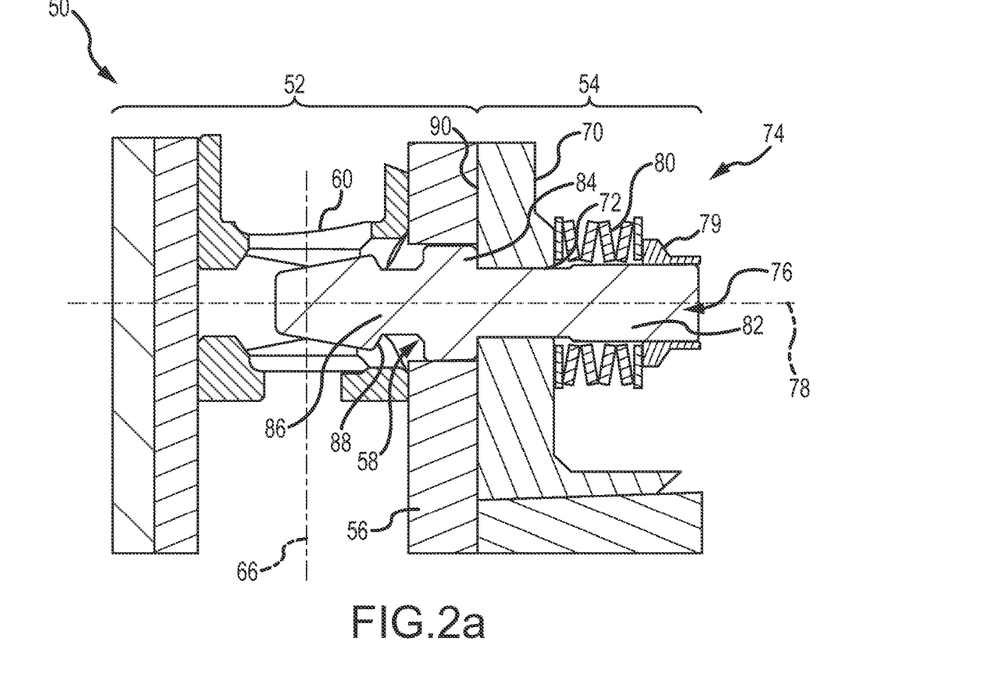
FIGS. 2a and 2b are section views of an embodiment of a longitudinal, tolerance-mitigating cam-lock fastening system in unlocked and locked positions.
Figure 2B:
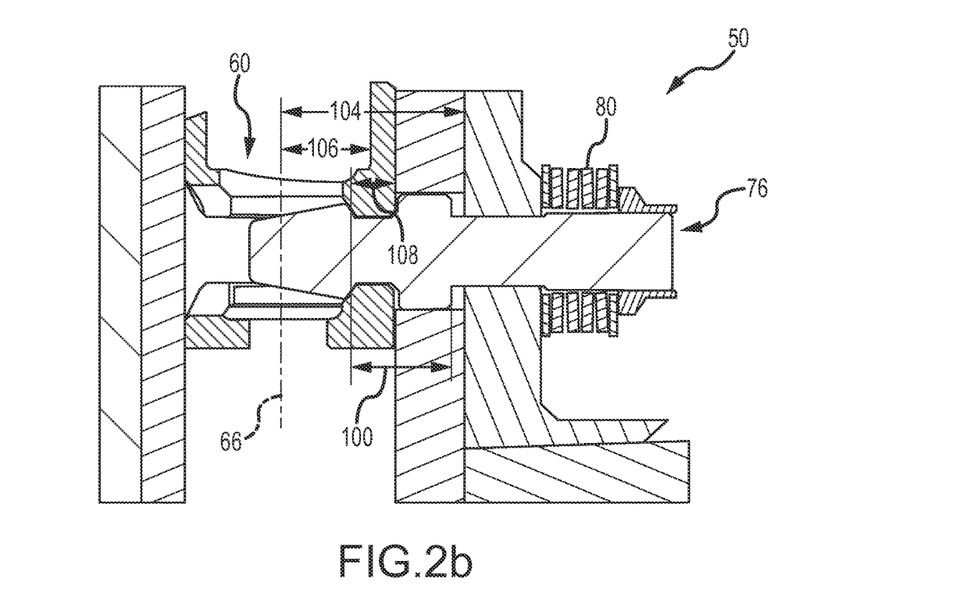
Figures 3A, 3B:
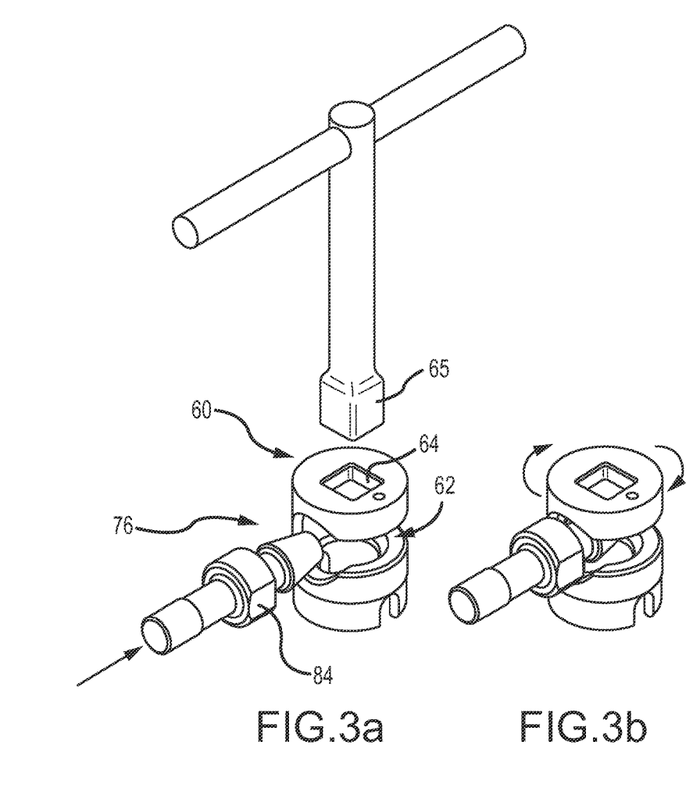
FIGS. 3a through 3d are views of the pin and cam-lock aligned for insertion, inserted, partially cammed and fully cammed and locked, respectively.
Figure 3C:
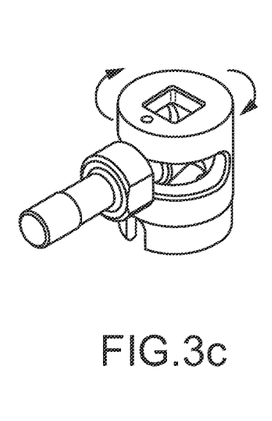
Figure 3D:
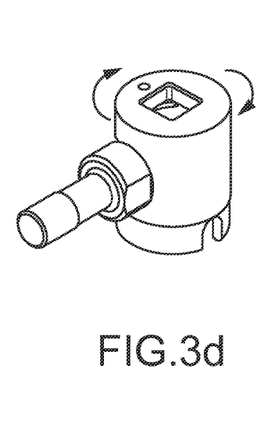

As shown in FIG. 2b, an embodiment of a tolerance analysis for the cam plate assembly includes five components. The tolerance for the pin height 100, distance from the pin-to-cam surface to the back of the shoulder, is 0.0025" for an 0.005" profile. The tolerance for the position of the cam hole 104, distance to the cam hole center, is 0.0020". The tolerance for the size of the cam hole (radius) 106 is 0.0010". The tolerance for the thickness of the locked cam 108 is 0.0025" for an 0.005" profile. The total tolerance stackup is +/−0.008" for this particular example. Although only exemplary, this tolerance stackup is representative of the general condition that the tolerance stackup is sufficiently large that a conventional cam-lock and threaded pin could not be used to fasten rigid structures, such as metal structures.

Figure 4:
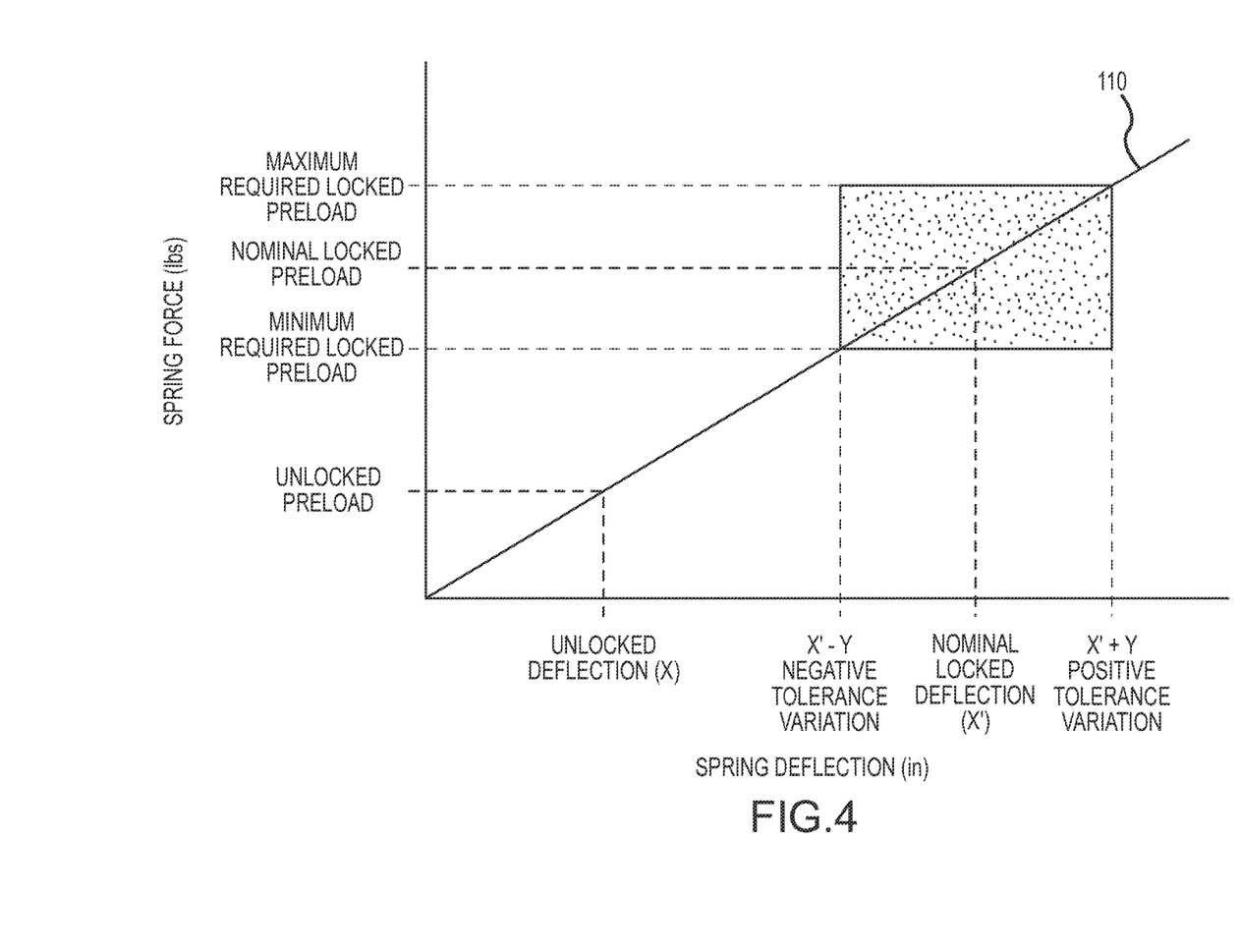
FIG. 4 is an exemplary plot of preload versus spring deflection.
Figure 5A:
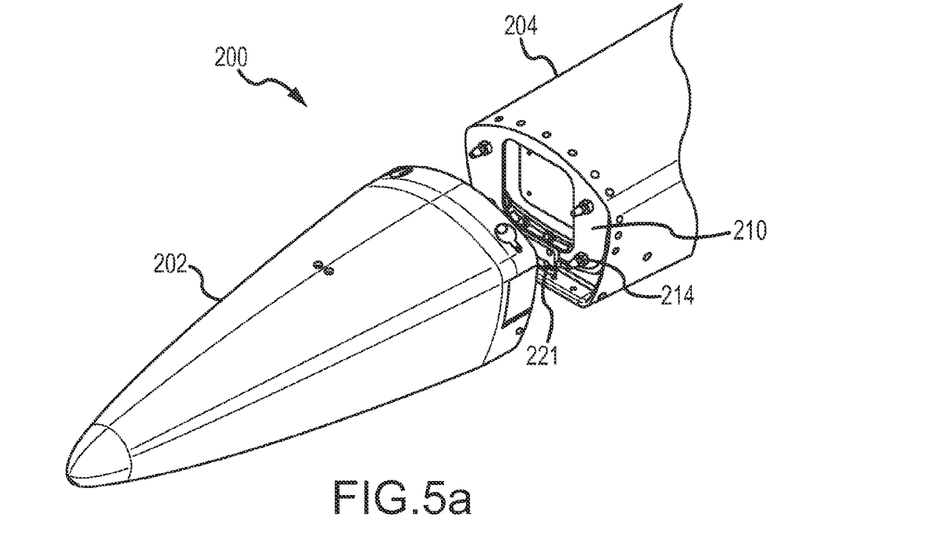
FIGS. 5a through 5d are different views of an embodiment of a cam-lock fastening system for attaching (and detaching) a payload to a missile airframe.
Figure 5B:
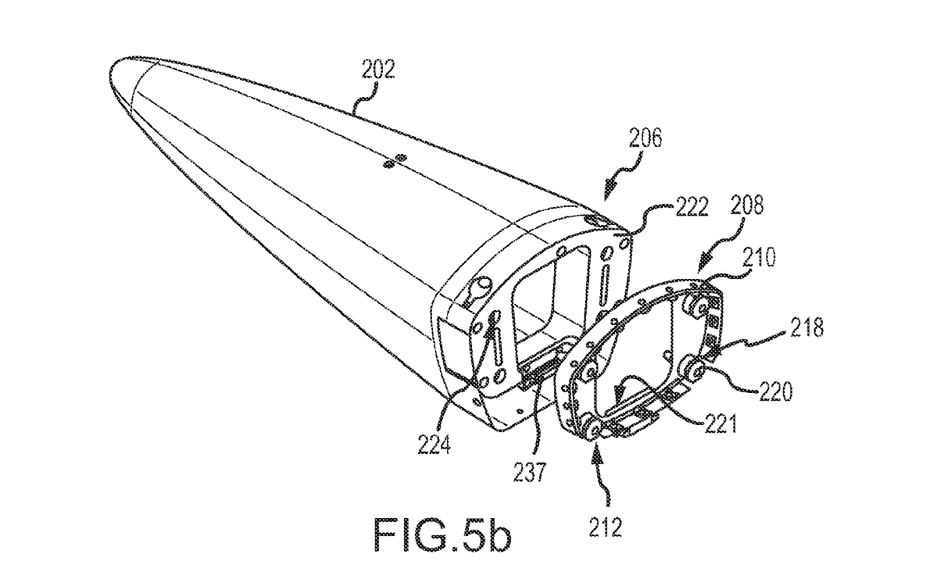
Figure 5C:
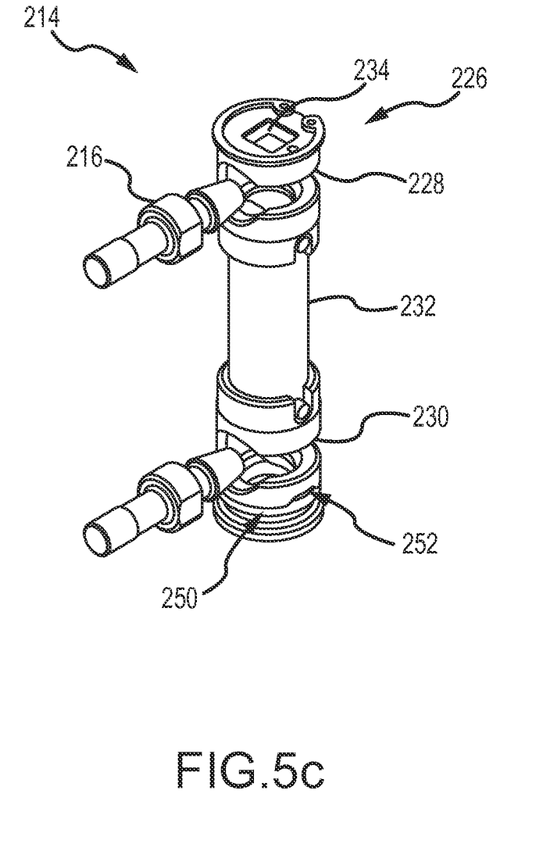
Figure 5D:
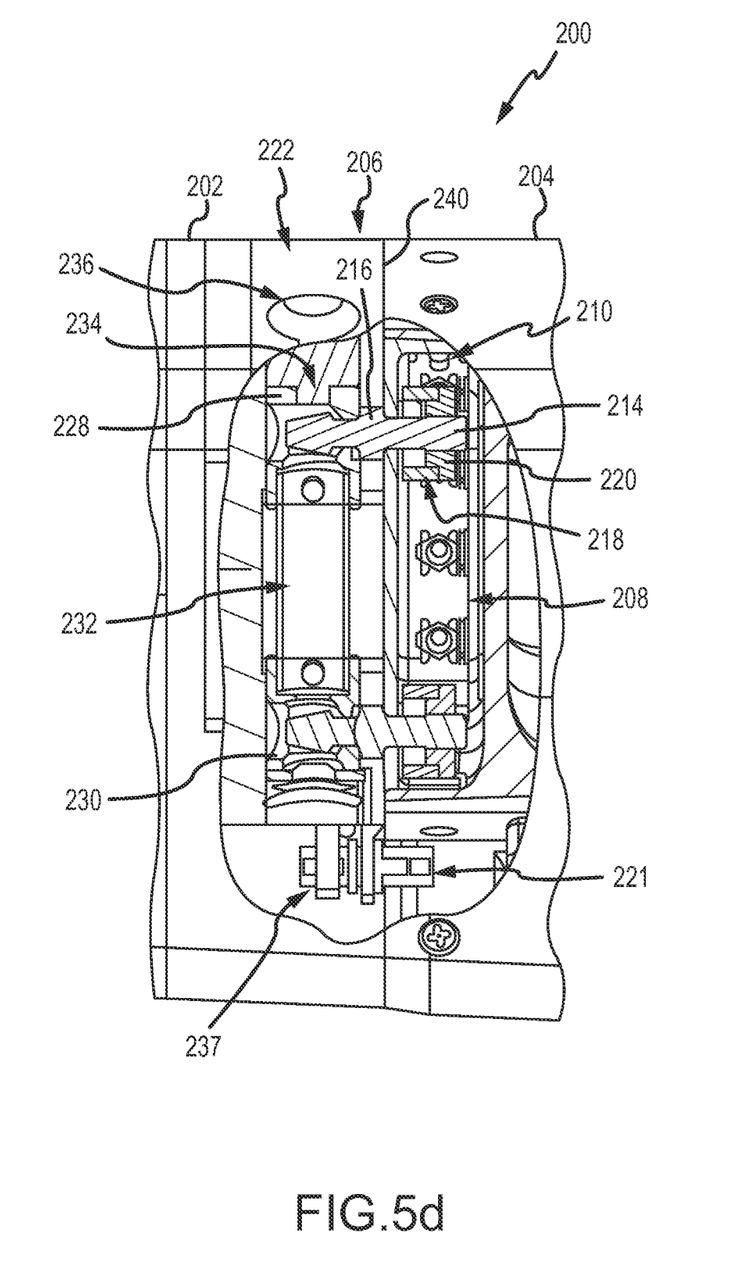

Referring now to FIG. 4, the spring constant is designed to provide a linear deflection vs. force response 110 such that in the unlocked state the spring is compressed to a known deflection (X) and subsequent unlocked preload. The value of this deflection (X) is such that in the locked state (nominally identified as X'), regardless of the tolerance variation (+/−Y), a minimum required preload is achieved (X'−Y). Since the response is linear it is known that the linear deflection of the pin, caused by the rotation of the cam-lock and coupled with the potential tolerance variation, will compress the spring from (X) to a point within the range (X'+/−Y) ensuring that the minimum required preload is achieved.

An embodiment of a spring-loaded cam-lock fastening system 200 for attaching and detaching a missile payload 202 to a missile airframe 204 is illustrated in FIGS. 5a through 5d. The overall fastening system bears considerable resemblance to the system used for INDYCAR®. However, the threaded pin and adjustment nut have been replaced with the pin plate assembly including the spring-loaded pin. This eliminates the necessity for manual tuning of the pin and provides a preload greater than a specified minimum load.

Spring-loaded cam-lock fastening system 200 includes a cam plate assembly 206 fastened to the aft end of missile payload 202 and a pin plate assembly 208 fastened to the forward end of missile airframe 204. Pin plate assembly 208 includes a pin plate 210 that is fastened to missile airframe 204. Spring-loaded pin assemblies 212 are positioned in four through holes near the corners of pin plate 210. To position each assembly, a pin 214 is inserted into the through hole until its shoulder 216 engages the pin plate, a spring 218 is placed around the portion of the pin extending aft through the pin plate, and a nut 220 is threaded onto the aft end of the pin to form a stop. The nut is adjusted to set the initial deflection of spring 218. An electrical connector 221 is mounted on pin plate 208 and wired to electrical systems in the missile airframe. The connector is positioned axially with respect to the airframe and parallel to the pins.

Cam plate assembly 206 comprises a cam plate 222 having four through holes 224 formed therein in a spatial layout that matches the pin layout. A pair of cam-lock assemblies 226 are mounted within the cam plate 222. Each cam-lock assembly 226 includes a pair of cam-locks 228 and 230 attached to opposite ends of a cam shaft 232. The top cam-lock 228 includes a key port 234 that is accessible through a port 236 in the cam plate assembly. A mating electrical connector 237 is mounted on the cam plate and wired into electrical systems in this payload/missile section. It is positioned to line up exactly with the electrical connector 221 once the sections are joined The missile payload 202/cam plate assembly 206 is aligned to the missile airframe 204/pin plate assembly 208. The cam-locks are rotated to their uncammed, unlocked position and the pins are inserted into the cams-locks. For each cam-lock assembly, a key is inserted through port 236 to engage key port 234 and rotated until fully cammed and locked. Rotation of the cam-lock engages and draws the pins forward such that the pin shoulders are pulled away from the pin plate causing the springs to compress further and preload a surface 240 between the cam plate and pin plate (missile payload and missile airframe) with a clamping load between specified minimum and maximum loads as the cam-lock rotates to a fully cammed and locked position.

Once fully cammed, the cam-locks will stay in the locked position unless and until the key is used to disengage the cam-lock and rotate it to the unlocked position. Beneath each cam-lock assembly is a spring detent mechanism 250 that engages a notch 252 on the bottom of the cam-lock as it rotates into the locked position. Additionally, the spring is static during operation so it maintains positive preload preventing rotation to unlock the cam.

Figure 6:
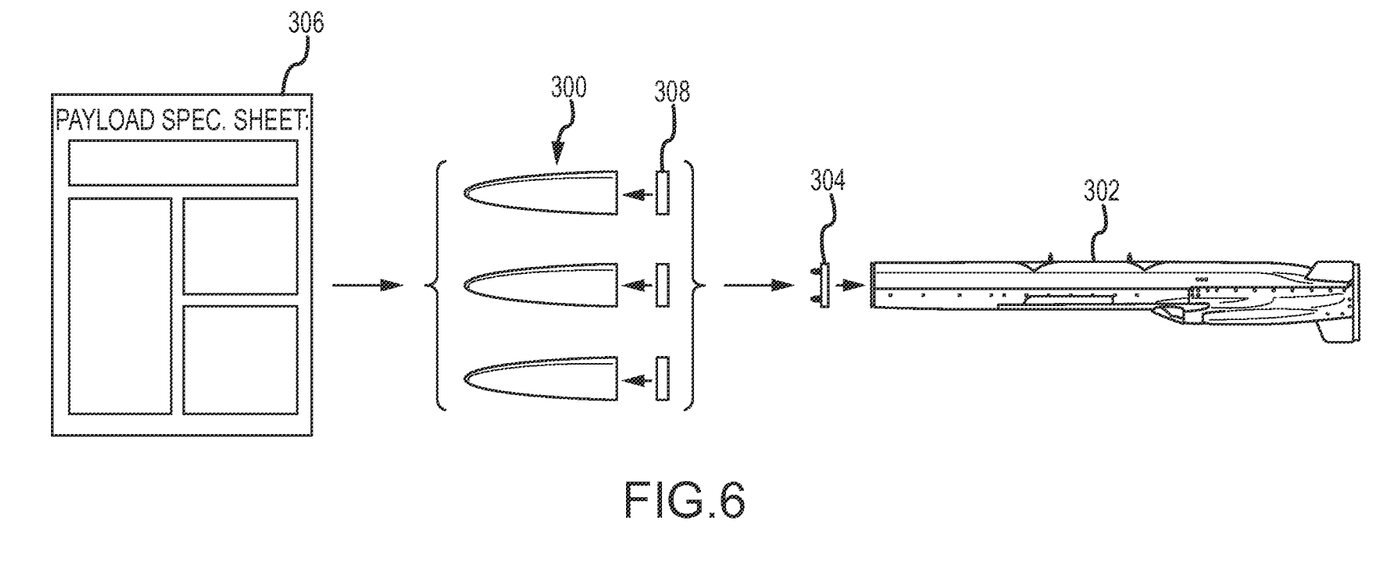
FIG. 6 is a diagram illustrating the use of the cam-lock fastening system to facilitate interchangeable payloads with a standard missile airframe.

FIG. 6 illustrates an embodiment of how the spring-loaded cam-lock fastener can be used to facilitate interchangeable attachment and detachment of mass-produced missile payloads 300 in a "plug & play" fashion to missile airframes 302. The missile manufacturer designs and builds the missile airframe 302 and pin-plate assembly 304 and promulgates a payload specification sheet 306 that, among other things, specifies the layout for the cam-lock assembly, the allowable tolerance stackup and the electrical pin out for the blind mating electrical connector. If the payload manufacturer designs and builds a payload 300 and cam plate assembly 308 according to the spec sheet 306, the payload can be quickly and easily fastened to the missile airframe without manual adjustment to provide a preloaded structural joint having a clamping load between specified minimum and maximum loads. The process also facilitates blind connection of electrical mating connectors on the missile body and payload.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A tolerance-mitigating cam-lock fastening system for attachment and detachment of first and second structures, said cam-lock fastening system comprising:
a pin plate assembly comprising a pin plate configured for attachment to said first structure and a pin assembly comprising a pin positioned through a first through hole in the pin plate along a longitudinal axis, said pin having a shoulder positioned forward of a front surface of the pin plate that is larger than the first through hole, a stop on an aft section of the pin, and a spring captured and compressed between the stop and a back surface of the pin plate, in an unlocked position said compressed spring drawing the pin aft so that its shoulder engages the front surface of the pin plate to preload a surface between the first and second structures with an unlocked preload based on a deflection of the spring from its relaxed position; and
a cam plate assembly configured for attachment to the second structure, said cam plate assembly comprising a cam-lock configured to receive the pin in an unlocked position and an engagement port configured to rotate the cam-lock to draw the pin forward along the longitudinal axis and draw the pin shoulder away from the front surface of the pin plate causing the spring to compress further and increase the preload a of the surface between the first and second structures to a nominal locked preload between specified minimum and maximum required locked preloads as the cam-lock rotates to a locked position;
wherein said first through hole has a first diameter, wherein said cam plate assembly comprises a cam plate having a second through hole of a second diameter larger than said first diameter, wherein said pin has an aft section having a diameter that is equivalent to said first diameter that extends through said first through hole in the pin plate, and wherein said pin shoulder has a diameter that is equivalent to said second diameter and extends within said second through hole in said cam plate.

2. The tolerance-mitigating cam-lock fastening system of claim 1, wherein the pin plate assembly comprises an electrical connector and the cam plate assembly comprises a mating electrical connector, wherein in the unlocked position the mating electrical connector is aligned to the electrical connector, wherein rotation of the cam-lock to draw the pin forward connects the electrical connector with the mating electrical connector.

3. The tolerance-mitigating cam-lock fastening system of claim 1, wherein the pin plate assembly is configured to attach to an exterior surface of the first structure or for integration with the first structure with said pin extending through a hole in said first structure and wherein the cam plate assembly is configured to attach to an exterior surface of the second structure or for integration with the second structure.

4. The tolerance-mitigating cam-lock fastening system of claim 1, further comprising a plurality of said pin plate assemblies for attachment to different first structures and a plurality of said cam plate assemblies for attachment to different second structures, said plurality of pin plate assemblies and cam plate assemblies configured for interchangeable attachment and detachment of different second structures to different first structures.

5. The tolerance-mitigating cam-lock fastening system of claim 4, wherein said plurality of pin plate assemblies and cam plate assemblies are configured for interchangeable attachment and detachment of different second structures to different first structures without manual adjustment of said pins.

6. The tolerance-mitigating cam-lock fastening system of claim 1, wherein said pin plate assembly comprises a hole pattern of a plurality of said first through holes formed in said pin plate and a like plurality of pin assemblies positioned there through, wherein said cam plate assembly comprises a like plurality of cam-locks.

7. The tolerance-mitigating cam-lock fastening system of claim 1, wherein the stop comprises an adjustable stop threaded onto the aft section of the pin to set an initial deflection of the spring and the unlocked preload.

8. A cam-lock fastened structure, comprising:
a first structure;
a second structure;
a pin plate assembly comprising
a pin plate attached to said first structure, said pin plate haying a first through hole having a first diameter,
a pin positioned through the first through hole along a longitudinal axis, said pin having an aft section with a diameter equivalent to said first diameter that extends aft through the first through hole in the pin plate, a shoulder having a second diameter greater than said first diameter and a forward section recessed to define an aft facing pin-to-cam contact surface,
a stop on the aft section of the pin, and
a spring around the aft section of the pin captured and compressed between the stop and a back surface of the pin plate, in an unlocked position said compressed spring drawing the pin aft so that its shoulder engages a front surface of the pin plate to preload a surface between the first and second structures with an unlocked preload based on a deflection of the spring from its relaxed position; and a cam plate assembly attached to the second structure, said cam plate assembly comprising a cam plate having a second through hole with a diameter equivalent to said second diameter to receive the shoulder of said pin, a cam-lock having a radial slot with an eccentric inner diameter sized to receive the forward section of the pin in the unlocked position and an engagement port configured for co-operating with a key to rotate the cam-lock about a rotation axis perpendicular to the longitudinal axis such that the radial slot engages the pin-to-cam contact surface and draws the pin forward along the longitudinal axis such that the pin shoulder is pulled away from the pin plate causing the spring to compress further and increase the preload a of the surface between the first and second structures to a nominal locked preload between specified minimum and maximum required locked preloads as the cam-lock rotates to a locked position.

9. The cam-lock fastened structure of claim 8, wherein said first structure is a missile body and said second structure is a missile payload.

10. The cam-lock fastened structure of claim 8, wherein the pin plate assembly is attached to an exterior surface of the first structure or integrated with the first structure with said pin extending through a hole in said first structure and wherein the cam plate assembly is attached to an exterior surface of the second structure or integrated with the second structure.

11. The cam-lock fastened structure of claim 8, wherein the pin plate assembly comprises an electrical connector and the cam plate assembly comprises a mating electrical connector, wherein in the unlocked position the mating electrical connector is aligned to the electrical connector, wherein rotation of the cam-lock to draw the pin forward connects the electrical connector with the mating electrical connector.

12. The cam-lock fastened structure of claim 8, further comprising a plurality of said pin plate assemblies for attachment to different first structures and a plurality of said cam plate assemblies for attachment to different second structures, wherein said different second structures can be interchangeably attached and detached from said different first structures.

13. The tolerance-mitigating cam-lock fastening system of claim 8, wherein the stop comprises an adjustable stop threaded onto the aft section of the pin to set an initial deflection of the spring and the unlocked preload.

\* \* \* \* \*